Feb. 25, 1964
F. J. LUKETA
3,121,968
BOBBIN FOR TRAWL NETS
Filed March 12, 1962
5 Sheets-Sheet 1
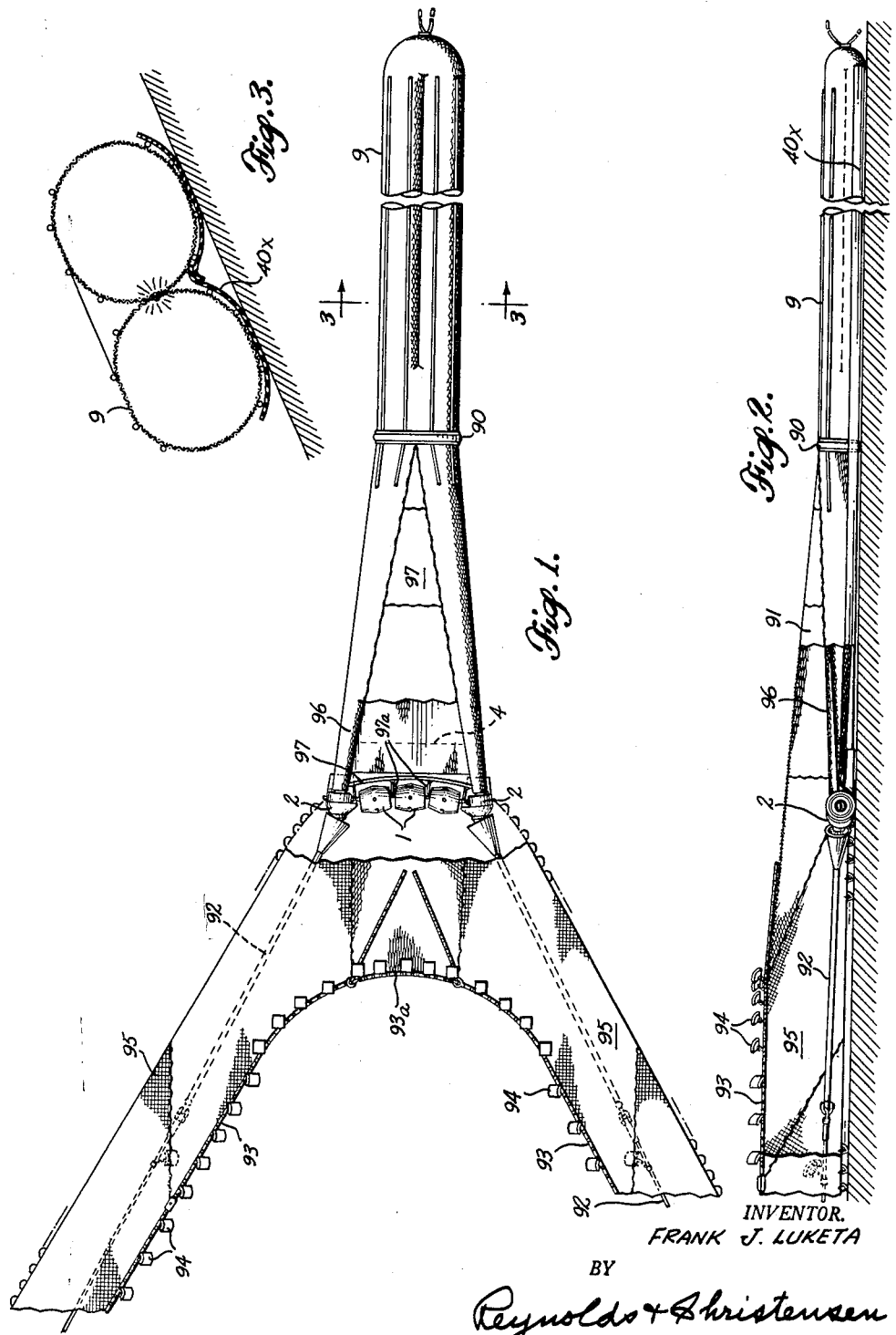
INVENTOR.
FRANK J. LUKETA
BY
Reynolds & Christensen
ATTORNEYS

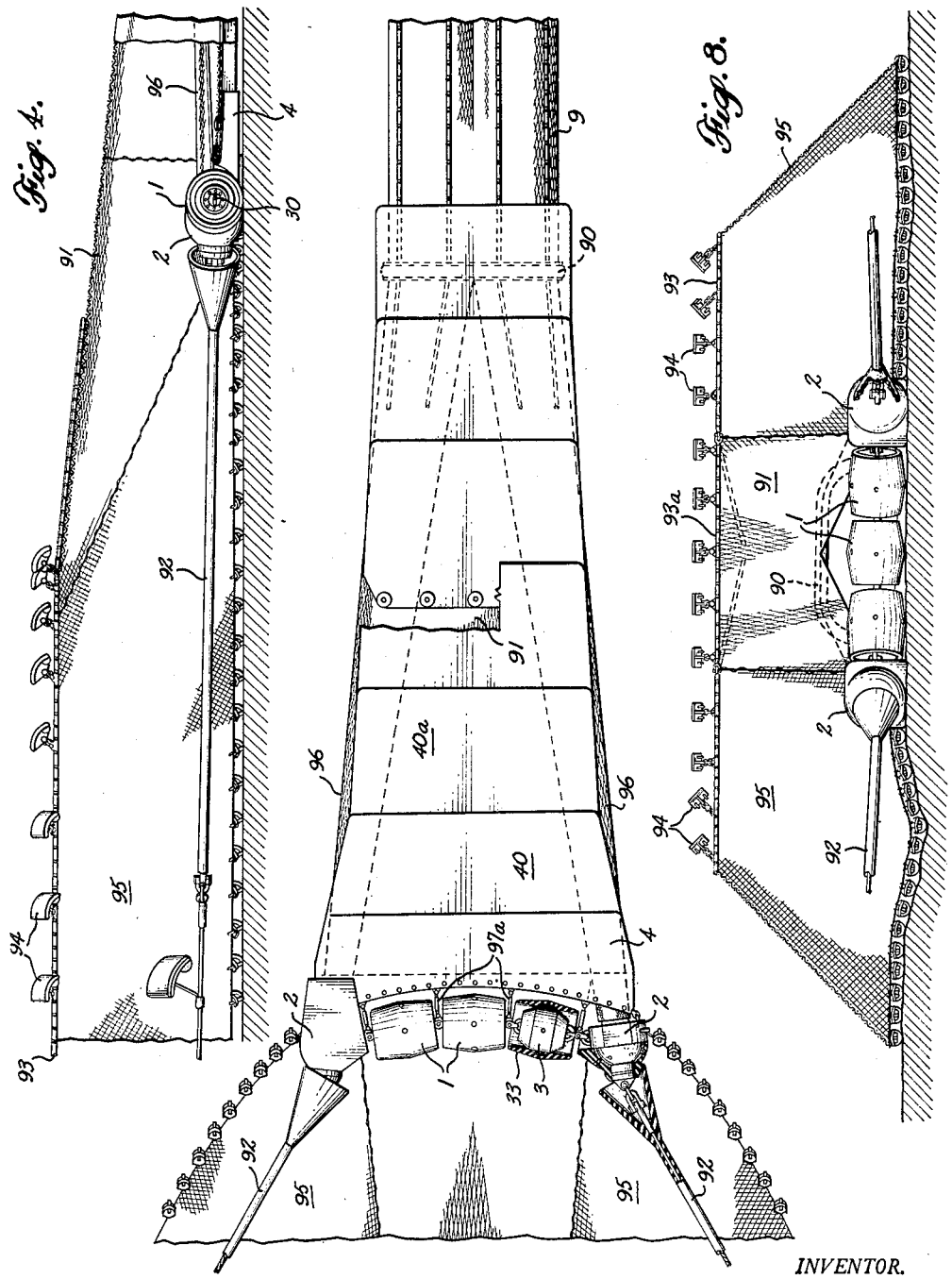

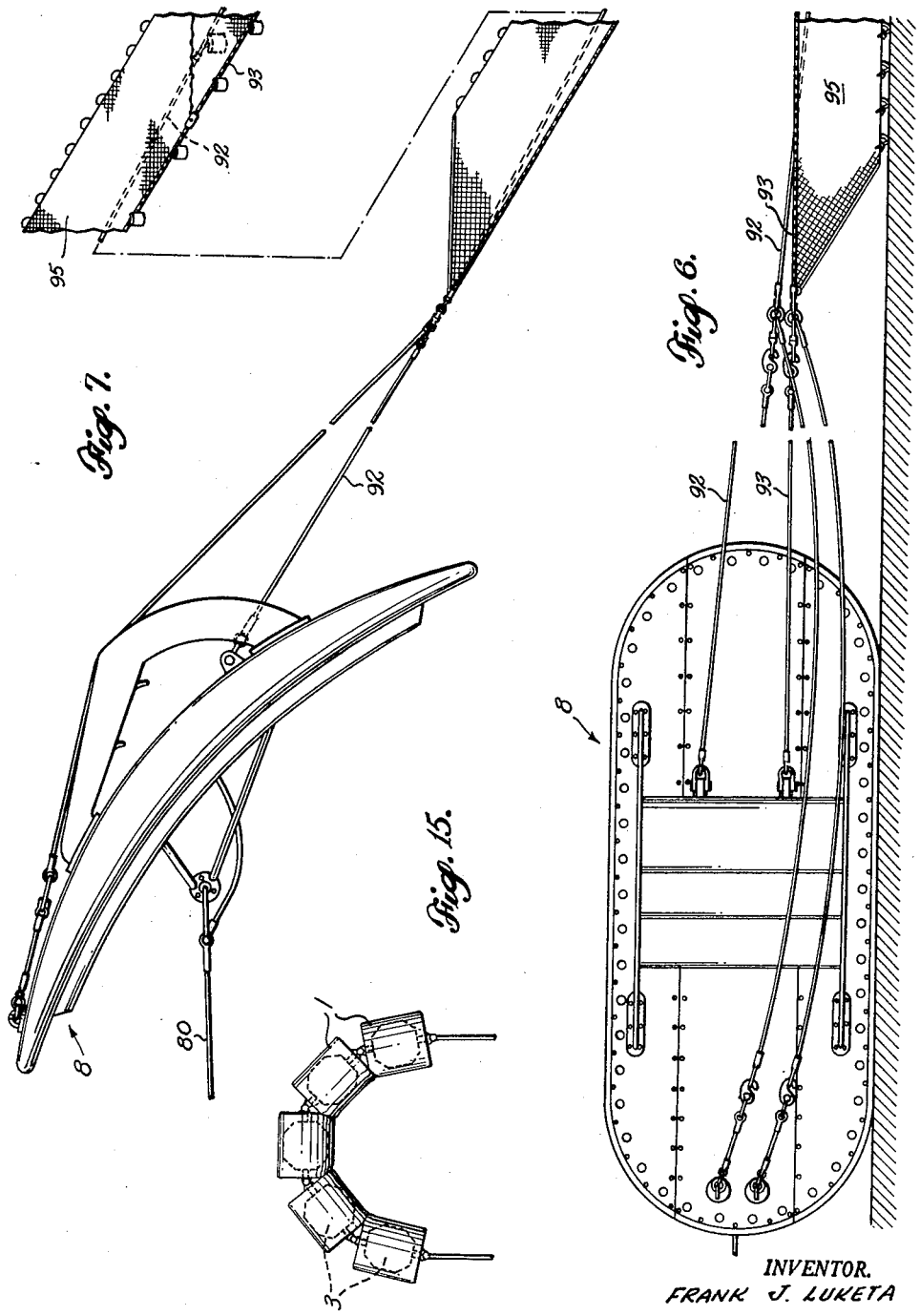

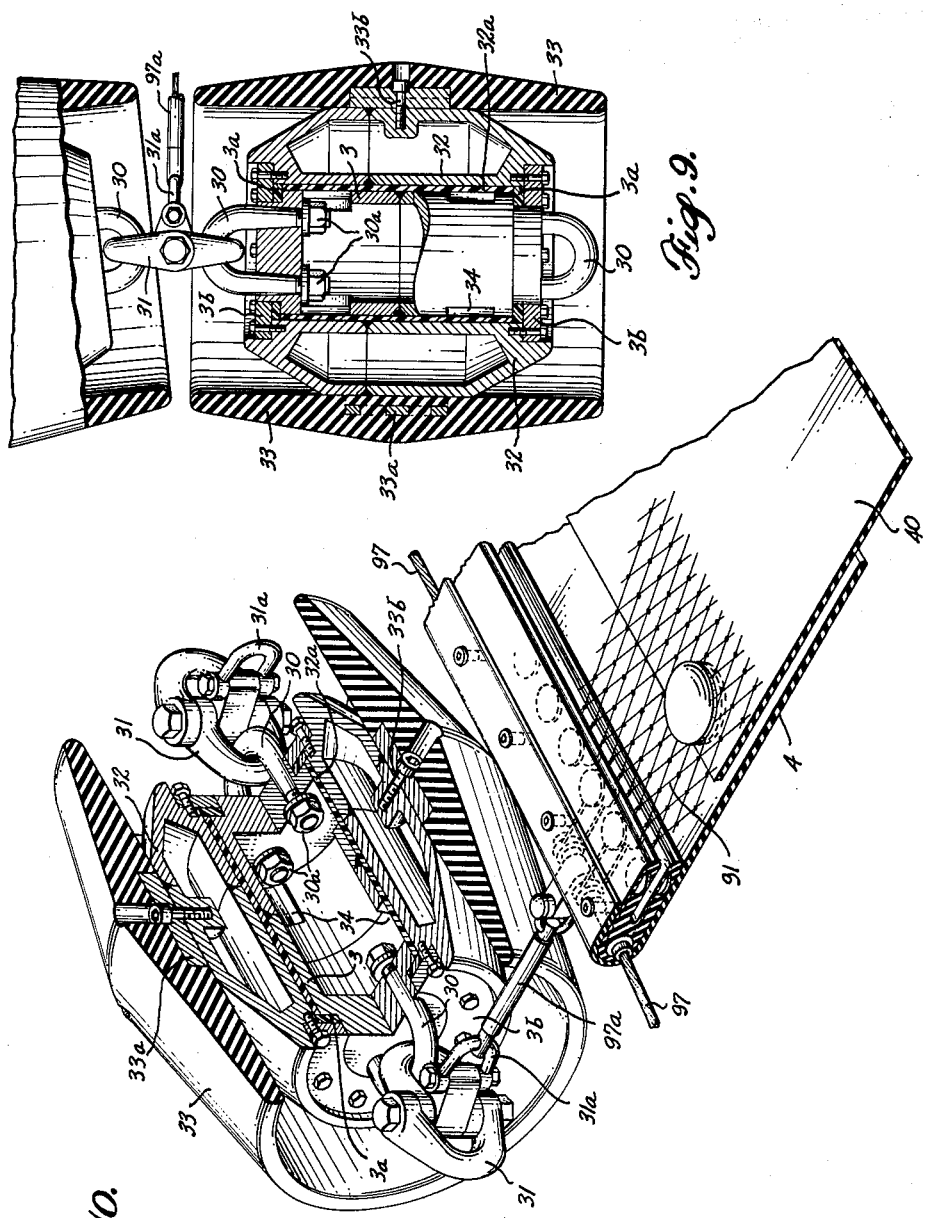

Feb. 25, 1964          F. J. LUKETA          3,121,968
BOBBIN FOR TRAWL NETS
Filed March 12, 1962          5 Sheets-Sheet 5
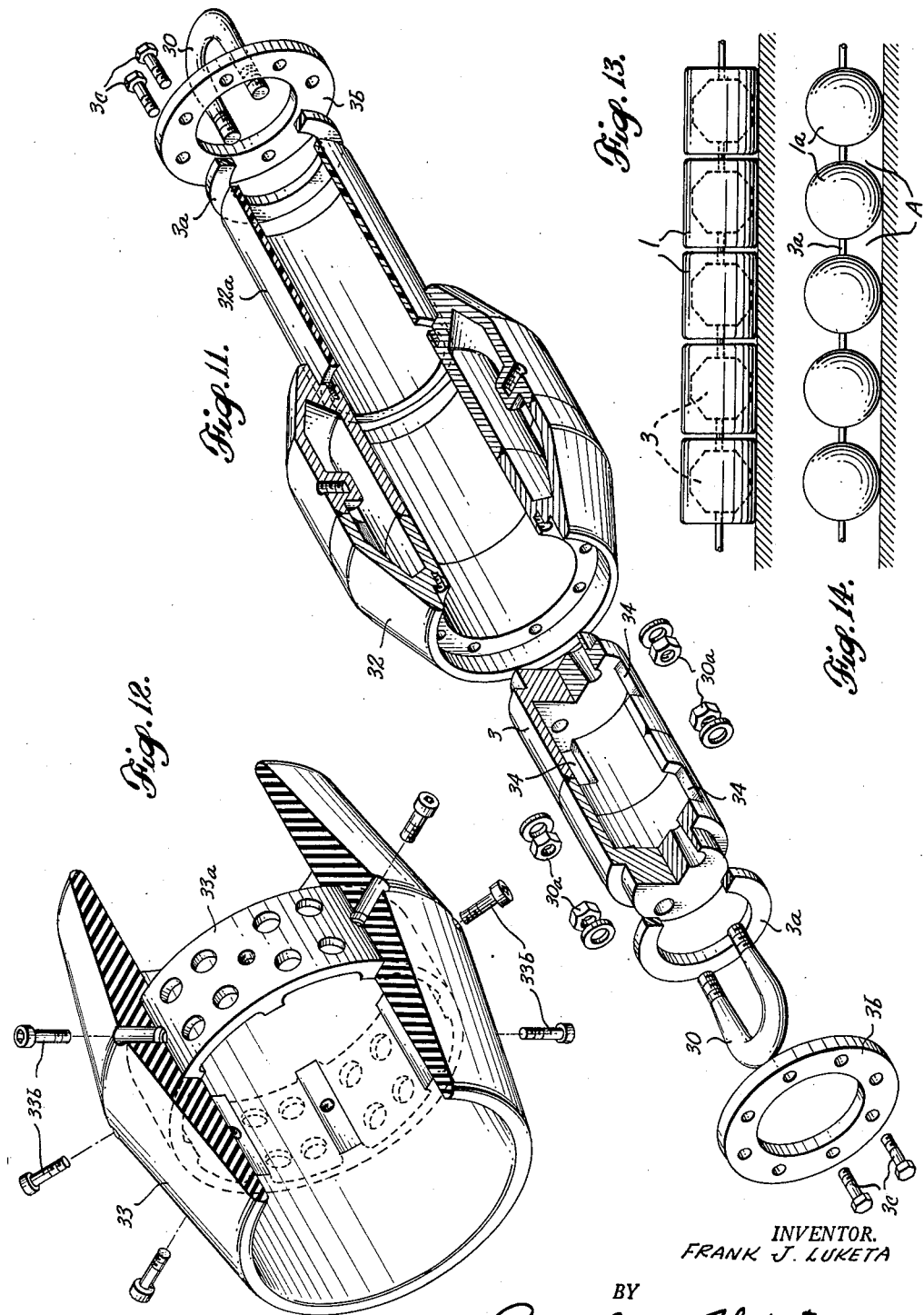
INVENTOR.
FRANK J. LUKETA
BY
Reynolds & Christensen
ATTORNEYS

United States Patent Office 3,121,968
Patented Feb. 25, 1964

3,121,968
BOBBIN FOR TRAWL NETS
Frank J. Luketa, 5567 Greenwood Ave., Seattle 3, Wash.
Filed Mar. 12, 1962, Ser. No. 178,901
14 Claims. (Cl. 43—9)

This invention deals generically with bottom trawl nets, and specifically with bobbins which roll over the bottom and are of sufficiently large diameter to hold the lower bosom of the net off the bottom, to avoid snagging it.

It is known that bobbins of this nature, often spherical in shape, will serve the purpose indicated, but by the same token the bosom is held sufficiently off the bottom that, unless provision is made to insure that bottom fish will not pass through the gaps between adjoining spherical bobbins and beneath the bosom, many such fish will escape being caught, and the operation to an appreciable extent becomes inefficient. If in order to close the gaps the bobbins are made cylindrical and placed close together, the line of bobbins cannot bow as it is pulled forwardly by the ends of the line, and the bobbin line assumes a catenary curvature.

According to one phase of the present invention bobbins of a novel shape, type, and construction are employed, by virtue of which the gaps are closed and the escape of fish prevented, even when very large bobbins—say, to three feet or more in diameter—must be used on certain bottoms in order to avoid "hanging up" or snagging the bosom line.

Since nets of this type are preferably handled by the drum trawling method, whereby all parts of the net body and all accessories to the same except the doors, but including the bobbins, are hauled in over the stern between upstanding guide posts rather closely spaced apart, it is necessary that these large bobbins be of a type and construction permitting them to contract as a group or be crowded together during the hauling-in (and net "shooting" or setting) operation, yet will cause them to expand to their full size and relative disposition for use, without effort or attention on the part of the crew.

A second phase of this invention concerns the form and assembly of bobbins to achieve the results just indicated.

It is also an object of this invention to provide a mechanically simple and efficient construction of bobbin and bobbin line, suitable to attain the results already indicated, and adequately rugged for the conditions it will encounter.

Other objects, especially those dealing with the specific structure employed, will appear more fully hereinafter.

The invention is shown in the accompanying drawings in a preferred form.

FIGURE 1 is a general plan view of a net, partly broken away, incorporating the bobbins of this invention.

FIGURE 2 is a side elevational view of the net, also broken away in part.

FIGURE 3 is a transverse sectional view at the line 3—3 of FIGURE 1.

FIGURE 4 is an enlarged vertical longitudinal sectional view of the net in the vicinity of the upper and lower bosoms.

FIGURE 5 is a bottom plan view of the same part of the net and of a part of the codend and chafing gear, partly broken away.

FIGURE 6 is a side elevational view, constituting a forward extension of FIGURE 2.

FIGURE 7 is a top plan view of the parts shown in FIGURE 6, and constituting a starboard forward extension of FIGURE 1.

FIGURE 8 is a transverse view looking from the left end of FIGURE 5, although now the net is right side up.

FIGURE 9 is an axial sectional view through a bobbin.

FIGURE 10 is an isometric view sectionally through a bobbin, and also illustrating associated net elements.

FIGURE 11 is an exploded isometric view, sectionally through a bobbin, but excluding the flexible peripheral portion, and FIGURE 12 is a similar view of the latter.

FIGURE 13 is a diagrammatic view of the bobbins of the present invention, showing the virtual absence of gaps that would prevent escape of fish, and FIGURE 14 is a similar view of bobbins of the prior art, showing such gaps.

FIGURE 15 is a diagrammatic view, showing how the bobbins of this invention can crowd together to pass through a small space.

A typical net with which this invention is useful is shown in FIGURES 1 to 8. It comprises a codend 9 which during trawling is closed at its after end, attached to a rigid expander ring 90 at its forward end; a funnel 91 diverges forwardly from the expander ring, to which it is attached, to lead fish through the latter and into the closed codend. The net is dragged forwardly along the bottom by sweep lines 92 and curtain lines 93 that diverge forwardly to doors 8, dragged in turn by towing warps 80. Each curtain line 93 is buoyed up by floats 94 or the like, and supports a curtain 95 that trails downwardly and aft to sweep the bottom with its free lower edge. Each sweep line 92, also buoyed up at intervals in its length, connects at its after end to a mesh suspender 96 the after end whereof is distributed about and connected to the expander ring 90. The meshes of each suspender are concentrated at their forward end and connected to a connector 2, to which a sweep line or ground line 92 is also connected. Such a net is to be taken as typical only, and not as restrictive. The sweep lines 92 and suspenders 96 assume the strain of hauling in.

The after ends of these sweep lines 92 are connected across the lower bosom of the net, in the same manner as the curtain lines 93 are connected, at 93a, across the upper bosom. The lower bosom is defined between the connectors 2 at the opposite sides, and it is essential that this lower bosom be elevated sufficiently off the bottom— say as much as eighteen inches— that it cannot snag on upstanding snags which it will encounter yet that sufficiently close contact be maintained with the bottom, entirely across the lower bosom, so that escape of fish beneath the bosom be prevented.

The elevation of the lower bosom above the bottom is achieved in this invention, as it has been in the past, by the use of large rolling bobbins 1, supported by a bobbin line to be described later. A bosom reinforcing line 97 extends between the connectors, aft of the bobbins, to which the netting proper is secured, and the line 97 is also secured to the connectors 2. The bobbin line is connected at intervals to the bosom reinforcing line 97 to support the latter, as by load-bearing lines or links 97a.

An arrangement of spherical bobbins typical of the prior art is shown in FIGURE 14. Such bobbins 1a have been more or less spherical, strung on and rolling about a bobbing line 3a. No matter how closely they may be strung, there still is an appreciable gap at A, through which fish can escape. Nondeformable cylindrical bobbins, if sufficiently close at their ends to prevent escape of fish, limit severely the flexibility of the bobbin line, and its ability to follow irregular contours of the bottom; also, they cannot be crowded closely enough together to pass between closely spaced upright posts during hauling or setting of the net; interengagement of the ends of adjacent bobbins precludes this.

According to this invention the bobbins 1 are approximately cylindrical externally, but are of flexible and resilient, wear-resistant material externally, upon a shorter rigid core which has relieved or frustoconical ends, whereby the ends, by flexing, will follow bottom contours, and whereby the adjacent ends of adjoining bobbins, by flexing, permit all bobbins on the bobbin line to be crowded about a small arc, to pass between the upright posts mentioned above. FIGURE 13 shows, by comparison with FIGURE 14, how nothing besides the shape of the bobbins themselves is needed to block escape of fish, and FIGURE 15 shows how, by flexing, the bobbins can be crowded into a small circle, for passage through a narrow passageway.

The bobbin line is made up of a series of cylindrical and nonrotative bearing sleeves 3, having U-bolts 30 projecting at their ends, and joined by triple clevises 31. Rollers 32 of metal or other rigid material are rotative about the sleeves 3, and externally are frustoconical at their ends. A peripheral rim 33 of wear-resistant and flexible material is secured to the rollers 32, and projects beyond the ends of the latter. All this is shown in FIGURES 9, 10 11 and 12. The rims 33 are shown as substantially cylindrical, but might assume other similar shapes, whereby to close any gaps between adjacent rims. Each bearing sleeve 3 is apertured at 34, conveniently for application of a wrench to the nuts 30a which secure the U-bolts 30. A sleeve 32a of antifriction material, such as nylon, is interposed between each sleeve 3 and its roller 32, as a radial bearing, and similar end thrust disks or rings 3a are interposed between the ends of the bearing sleeves 3 and metal rings 3b which are secured to the rollers 32 by the cap screws 3c, constituting end thrust bearings. The rim 33 incorporates a narrow metal ring 33a whereby the rim can be secured to the zone of greatest diameter of the roller 32, intermediate its ends, through screws 33b. Two articulated halves of the triple clevis 31 connect to the respective U-bolts 30 of adjacent bobbins. The third articulated clevis part, designated 31a, constitutes an anchorage for the forward end of a load-bearing link 97a, previously referred to, which supports the bosom line 97.

The flexible rim 33 projects axially beyond each end of its supporting roller or core 32, to the extent that it cooperates with the rim of the adjacent bobbin to substantially enclose the connections between bobbins. When the trawl net is in use the ends of rims 33 of adjacent bobbins nearly touch at the concave forward side of the bobbin line; see FIGURES 5 and 9. There is a slight gap between them at the convex side, which allows the load-bearing link 97a to extend aft to the line 97, without interference. Because the several rims 33, as shown, are nearly cylindrical when relaxed, they leave not gap between them, as do spherical rollers; compare FIGURES 13 and 14. If a given roller encounters a snag, its rim 33 flexes, and the bobbin line rides over the snag with no appreciable gap being formed between bobbins, and immediately resumes its generally cylindrical shape. When the net is being hauled, pull on the two sweep lines 92 and so upon the connectors 2 tends to lessen the normal catenary curvature of the bosom line, and to crowd the several bobbins into a small circle. The longer rims 33 of the several bobbins flex about the frustoconical ends of their shorter rollers 32, as shown in FIGURE 15, and by virtue of this the entire set of bobbins can pass between upright posts at the stern of the trawler which are so closely spaced that this would be impossible except by this or an equivalent construction. The rims 33 are flexible, yet always tend to resume their cylindrical forms, hence they will always close the gap beetween bobbins automatically.

Various other features are shown in the drawings which pertain to other inventions, and need not be described in detail. For example, chafing gear sheets 4, 40, 40a, etc., to 40x, are applied to the underside of the net's funnel and codend. Such sheets are of rubber or like wear-resistant material. The codend is constricted top and bottom, longitudinally (see FIGURE 3). This gives it a broad base, so that it will not roll on a sloping bottom, and constricts it so that it, with its load, can pass between spaced upright posts during hauling, and will not hang up. These and other like features do not particularly affect the present invention, and are thus briefly described to clarify the showing.

I claim as my invention:

1. In a trawl net which includes a funnel defining a lower bosom directed transversely, a plurality of bobbins, means supporting the bobbins to roll each about its axis as the net advances, and to dispose them in closely spaced end to end relationship across the lower bosom, each bobbin including a rim element of generally cylindrical and tubular shape, the ends whereof are disposed closely adjacent the ends of adjacent bobbins, and, of resiliently flexible, wear-resistant material, and a core of nonyielding material spaced at its end from its rim element, and from the cores of adjacent bobbins, to afford room for the rim elements to flex inwardly at the ends under the influence of an external force.

2. In a trawl net which includes a funnel defining a lower bosom directed transversely, a plurality of bobbins interconnected end to end across said lower bosom, means mounting each bobbin to roll about its axis as the net advances, and so to support the lower bosom above the bottom, the bobbins each including a generally cylindrical and tubular but resiliently flexible rim, and the mounting means being relieved at its ends to accommodate inward flexing of the respective rims upon encountering a deforming force.

3. The combination of claim 2, wherein the flexible rim of each bobbin extends axially beyond the corresponding ends of its mounting means.

4. The combination of claim 3, including flexible means interconnecting the ends of the mounting means of adjoining bobbins, and of a length to be housed substantially wholly in the flexible overhangs of the so-interconnected mounting means.

5. The combination of claim 2, wherein the mounting means for each bobbin is frustoconical at its ends, and the flexible rim is mounted at its central zone only upon said mounting means, and is spaced at its ends from the frustoconical ends of its mounting means, for relief to accommodate inward flexing, but inherently assume its generally cylindrical form until flexed by an external force.

6. In a trawl net terminating in its lower forward portion in a transverse lower bosom, a plurality of bobbins, each including a bearing sleeve, a roller journaled thereon, and a rim of generally cylindrical shape externally, of inherently form-sustaining and wear-resistant material, but flexible under applied force, said rim being mounted upon said roller, and the rim and roller being cooperatively shaped to afford room for inward flexing of the ends of the ring under applied force, and flexible means interconnecting said bearing sleeves end to end, and sufficiently closely that their rims are closely adjacent.

7. The combination of claim 6, wherein each roller has a central band of maximum diameter, whereto its rim is secured, and is of frustoconical shape towards its ends, to afford the room for inward flexing of the ends of the rims.

8. The combination of claim 6, wherein the rim of each roller extends axially beyond the corresponding ends of its bearing sleeve, to afford space between such ends and within the rims for the interconnecting means.

9. The combination of claim 6, the interconnecting means including a U-bolt protruding from the end of each bearing sleeve, and an articulated pair of clevises anchored to the respective U-bolts, and together constituting the flexible interconnecting means.

10. The combination of claim 9, and a third clevis pivotally connected to the articulated pair of clevises, and a load-bearing link connected to and extending from said third clevis, and outwardly between the adjacent bobbin rims.

11. A bobbin for use with a trawl net, comprising an axial bearing sleeve, a roller rotatively mounted upon said sleeve, and formed with a zone of maximum diameter between its ends, the ends being relieved towards their extremities from such zone, and a rim incorporating a mounting ring intermediate its ends, and otherwise of generally form-sustaining but flexible material, and of generally cylindrical shape externally, means for removably securing said rim to said roller, and means at each end of said bearing sleeve for joining the same non-rotatively to an end-adjoining element.

12. A bobbin as in claim 11, wherein the bearing sleeve is shouldered at each end, a nonfriction sleeve surrounding the bearing sleeve, intermediate the latter and the roller, and of a length equal to the distance between the shoulders at opposite ends, a ring also of nonfriction material seated upon each shoulder, a retaining ring externally of each nonfriction ring, and means to secure each retaining ring to the ends of the roller.

13. A bobbin for use with a trawl net, comprising an axial bearing sleeve and a generally cylindrical rim of resiliently flexible material surrounding and rotatively supported upon said bearing sleeve, and spaced radially from the latter at the ends of the rim.

14. A bobbin as in claim 13, wherein the rim extends axially beyond each end of the bearing sleeve.

References Cited in the file of this patent

UNITED STATES PATENTS

| | | |
|---|---|---|
| 1,830,215 | Vigneron | Nov. 3, 1931 |
| 2,744,350 | Bass | May 8, 1956 |

FOREIGN PATENTS

| | | |
|---|---|---|
| 519,510 | Belgium | May 15, 1953 |
| 221,985 | Great Britain | Sept. 25, 1924 |